L. Jennings,
Filtering Cup.
N° 33,281.   Patented Sep. 10, 1861.
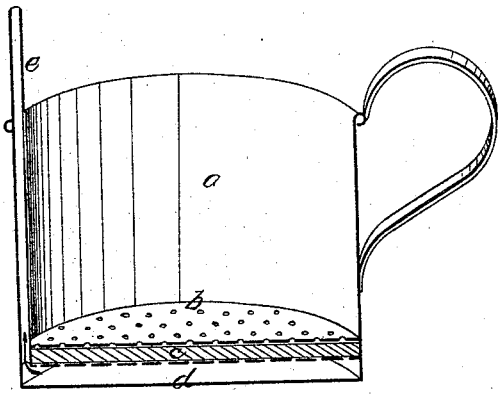
Witnesses:
James A. Tabor
G. F. Carwardine
Inventor:
Lewis Jennings
by his Attorney
J. P. Pirsson

UNITED STATES PATENT OFFICE.

LEWIS JENNINGS, OF BROOKLYN, ASSIGNOR TO HIMSELF, AND R. DICKINSON AND JOS. C. FULLER, OF NEW YORK, N. Y.

IMPROVED FILTERING-CUP.

Specification forming part of Letters Patent No. 33,281, dated September 10, 1861.

*To all whom it may concern:*

Be it known that I, LEWIS JENNINGS, of the city of Brooklyn and State of New York, have invented an Improved Drinking Cup or Vessel Combining a Filtering and Drinking Cup in One Vessel; and I do hereby declare that the following is a full, clear, and exact description of the same, reference being made to the annexed drawing, making a part of this specification, in which the figure represents a section of a cup and filter combined.

My improvement in drinking-cups or other similar vessels consists in combining or placing a filter within the same in such manner that any fluid poured into or dipped up by said cup may be filtered by the act of drinking in case the said fluid requires such filtering, or otherwise may be drank in the ordinary way from the open mouth of the vessel when the fluid to be drank is pure.

My improved cup is chiefly designed for the use of soldiers, as well as being useful to sportsmen, travelers, and others. The soldier is often obliged to quench thirst by drinking from stagnant pools or other reservoirs or streams in which the water is impure, also in the dark, when he cannot judge of the quality of the water before drinking. My improvement obviates risk in all such cases by providing a ready means of filtering and purifying the water while in the act of drinking it.

The drawing represents a sectional view of a drinking-cup with my improvement. The cup may be of any of the usual shapes and of any desirable material, as tin, &c. As shown at $a$, near the bottom I solder or otherwise attach a filtering-diaphragm $b$, consisting of two perforated plates having between a stratum of powdered charcoal or other filtering medium $c$. Beneath this diaphragm is a space $d$, into which the filtered water falls. Communicating with this space is a flattened tube $e$, which passes up from the bottom alongside of the cup and terminates a little above the rim, as shown.

The mode of using is as follows: In the case of dipping up impure water the mouth is applied to the tube $e$, and by drawing in the air in $d$ is exhausted and the water is immediately strained by passing down through the filter $b\ c$. After long use, if the filter becomes foul, it is to be cleansed by pouring in clean water, and then by alternately drawing or sucking and blowing back, the same principle is employed as in the case of a reversible filter attached to hydrants. When the water is pure it can be drank in the usual way of any common cup.

I claim—

Applying a filter to or near the bottom of any ordinary drinking-cup and attaching a tube to the cup and filter in such a way that the act of drinking through the tube shall effect the filtering of the liquid, substantially as described herein.

In witness whereof I have hereunto set my hand and affixed my seal.

LEWIS JENNINGS. [L. S.]

Witnesses:
I. P. PIRSSON,
R. DICKINSON.